US011980823B2

(12) United States Patent
Bergant

(10) Patent No.: US 11,980,823 B2
(45) **Date of Patent: *May 14, 2024**

(54) ROULETTE RIM TILT DETECTION

(71) Applicant: Interblock d.o.o., Menges (SI)

(72) Inventor: Urban Bergant, Kamnik (SI)

(73) Assignee: INTERBLOCK D.O.O., Menges (SI)

( * ) Notice: Subject to any disclaimer, the term of this patent is extended or adjusted under 35 U.S.C. 154(b) by 0 days.

This patent is subject to a terminal disclaimer.

(21) Appl. No.: 17/953,193

(22) Filed: Sep. 26, 2022

(65) Prior Publication Data

US 2023/0053002 A1 Feb. 16, 2023

Related U.S. Application Data

(63) Continuation of application No. 17/063,536, filed on Oct. 5, 2020, now Pat. No. 11,452,934.

(60) Provisional application No. 62/914,308, filed on Oct. 11, 2019.

(51) Int. Cl.
*A63F 5/00* (2006.01)
*G08B 5/36* (2006.01)

(52) U.S. Cl.
CPC .................. *A63F 5/00* (2013.01); *G08B 5/36* (2013.01); *A63F 2250/1005* (2013.01); *A63F 2250/58* (2013.01)

(58) Field of Classification Search
CPC ................ A63F 5/00; A63F 2250/1005; A63F 2250/58; G08B 5/36
USPC ........................................................... 463/17
See application file for complete search history.

(56) References Cited

U.S. PATENT DOCUMENTS

| | | | | |
|---|---|---|---|---|
| 4,077,631 | A * | 3/1978 | Tela, Sr. | A63F 5/00 273/142 E |
| 8,028,993 | B2 * | 10/2011 | Witty | A63F 5/00 273/142 E |
| 8,277,304 | B1 | 10/2012 | Rasmussen et al. | |
| 8,622,825 | B2 | 1/2014 | Griswold et al. | |
| 2007/0026925 | A1 | 2/2007 | Gelinotte | |
| 2009/0124359 | A1 | 5/2009 | Beavers | |

(Continued)

FOREIGN PATENT DOCUMENTS

| | | | |
|---|---|---|---|
| EP | 2065079 | A1 | 6/2009 |
| WO | WO 2017/203215 | A1 | 11/2017 |

OTHER PUBLICATIONS

International Patent Application No. PCT/US2020/054442; Int'l Search Report and the Written Opinion; dated Jan. 5, 2021; 20 pages.

(Continued)

*Primary Examiner* — Allen Chan
(74) *Attorney, Agent, or Firm* — BakerHostetler

(57) ABSTRACT

A tilt detection system including a roulette wheel, at least one inclination sensor positioned on or within a rim of the roulette wheel, and a display module comprising a plurality of light outputs. The tilt detection system can obtain positional data during operation of the roulette wheel and determine tilt data indicative of the roulette wheel's position relative to a baseline indicative of a leveled state. A roulette wheel tilt status, e.g., level, warning, and error, may be determined based on the tilt data, and a display module can activate the plurality of light outputs based on the tilt status. Two or more stepper motors may lever the roulette wheel in response to the tilt status.

20 Claims, 8 Drawing Sheets

(56) References Cited

U.S. PATENT DOCUMENTS

| | | | |
|---|---|---|---|
| 2009/0174141 | A1 | 7/2009 | Witty |
| 2014/0265113 | A1 | 9/2014 | Pines |
| 2018/0315276 | A1 | 11/2018 | Persson et al. |
| 2020/0279450 | A1 | 9/2020 | Bernard et al. |

OTHER PUBLICATIONS

International Patent Application No. PCT/US2020/054442; Int'l Preliminary Report on Patentability; dated Oct. 27, 2021; 18 pages.

* cited by examiner

| | | | | | | | | | | | | | | | | | | | | | |
|---|---|---|---|---|---|---|---|---|---|---|---|---|---|---|---|---|---|---|---|---|---|
| 34432 | 5.5.2019 7:17:34 | 40,07s | 41,76s | 9,72s | OK | OK | N/A | 00 | 19 | 255 | Normal | 38 | 4.03 | 1,050° | -0,025° | 0 | 100 | 100 | 0 | 100 | 1210 |
| 34431 | 5.5.2019 7:16:48 | 43,96s | 46,62s | 11,76s | OK | OK | N/A | 1 | 20 | 255 | Normal | 38 | 4.03 | 1,050° | -0,025° | 0 | 100 | 100 | 0 | 100 | 1690 |
| 34430 | 5.5.2019 7:16:02 | 43,03s | 45,42s | 11,77s | OK | OK | N/A | 0 | 0 | 255 | Normal | 38 | 4.03 | 1,050° | -0,025° | 0 | 100 | 100 | 0 | 100 | 1460 |
| 34429 | 5.5.2019 7:15:18 | 42,24s | 44,22s | 10,33s | OK | OK | N/A | 23 | 4 | 255 | Normal | 38 | 4.03 | 1,050° | -0,025° | 0 | 100 | 100 | 0 | 100 | 1270 |
| 34428 | 5.5.2019 7:14:34 | 42,06s | 44,21s | 10,45s | OK | OK | N/A | 4 | 5 | 255 | Normal | 38 | 4.03 | 1,050° | -0,025° | 0 | 100 | 100 | 0 | 100 | 1310 |
| 34427 | 5.5.2019 7:13:51 | 40,40s | 42,99s | 9,75s | OK | OK | N/A | 27 | 18 | 255 | Normal | 38 | 4.03 | 1,050° | -0,025° | 0 | 100 | 100 | 0 | 100 | 1200 |
| 34426 | 5.5.2019 7:13:07 | 41,99s | 44,21s | 9,73s | OK | OK | N/A | 21 | 8 | 255 | Normal | 38 | 4.03 | 1,050° | -0,000° | 0 | 100 | 100 | 0 | 100 | 1260 |
| 34425 | 5.5.2019 7:12:22 | 41,62s | 44,21s | 10,33s | OK | OK | N/A | 11 | 33 | 255 | Normal | 38 | 4.03 | 1,050° | -0,025° | 0 | 100 | 100 | 0 | 100 | 1240 |
| 34424 | 5.5.2019 7:11:37 | 42,95s | 45,39s | 11,77s | OK | OK | N/A | 32 | 30 | 255 | Normal | 38 | 4.03 | 1,050° | -0,025° | 0 | 100 | 100 | 0 | 100 | 1520 |
| 34423 | 5.5.2019 7:10:53 | 42,61s | 44,25s | 11,77s | OK | OK | N/A | 14 | 2 | 255 | Normal | 38 | 4.03 | 1,050° | -0,025° | 0 | 100 | 100 | 0 | 100 | 1510 |
| 34422 | 5.5.2019 7:10:05 | 45,12s | 47,84s | 11,77s | OK | OK | N/A | 3 | 24 | 255 | Normal | 38 | 4.03 | 1,050° | -0,025° | 0 | 100 | 100 | 0 | 100 | 1720 |
| 34421 | 5.5.2019 7:09:18 | 44,69s | 46,64s | 11,75s | OK | OK | N/A | 35 | 3 | 255 | Normal | 38 | 4.03 | 1,050° | -0,025° | 0 | 100 | 100 | 0 | 100 | 1480 |
| 34420 | 5.5.2019 7:08:34 | 42,11s | 44,22s | 11,78s | OK | OK | N/A | 4 | 5 | 255 | Normal | 38 | 4.03 | 1,050° | -0,025° | 0 | 100 | 100 | 0 | 100 | 1750 |
| 34419 | 5.5.2019 7:07:50 | 41,70s | 44,16s | 10,42s | OK | OK | N/A | 32 | 30 | 255 | Normal | 38 | 4.03 | 1,050° | -0,025° | 0 | 100 | 100 | 0 | 100 | 1300 |

X First rec. in cycle OK Record OK W Warning E Error RMG PC generated G3 G4 G40 Imported data N/A Unknown Contains Video 44116 records | 1 PLC error (0,00227%) | 0 PLC warnings (0%) | 0 PLC errors (0%) | A6: Win Number Detection started at 10,30s, duration: 18,04s Additional cycle data:

PLC bets close estimate: 10350ms
Last PC bets close estimate: 0ms
Bets close estimate correction time: 50ms
Total fan ON time: 1300ms
Fan pre-blow time: 880ms
PC bets close time: 0ms
PLC bets close time: 0ms
Inclination data: X: 1,050° Y: -0,025°

Verifying rim inclination sensor data:

Displaying the average rim inclination around X and Y axis [Avg X/Y] through time. (Warning: > 0,120°, Error: > 0,200°)

Displaying the most extreme inclination angle around X and Y axis [MaxEx X/Y] through time. (Warning: > 0,170°, Error: > 0,250°)

[17.4.2019 - 18.4.2019: 2550 games] Avg X/Y: 0,000° - OK / 0,000° - OK MaxEx X/Y: -0,075° - OK / -0,075° - OK
[18.4.2019 - 20.4.2019: 2550 games] Avg X/Y: 0,010° - OK / 0,010° - OK MaxEx X/Y: -0,050° - OK / -0,050° - OK
[20.4.2019 - 21.4.2019: 2550 games] Avg X/Y: 0,014° - OK / 0,014° - OK MaxEx X/Y: -0,050° - OK / -0,050° - OK
[21.4.2019 - 22.4.2019: 2550 games] Avg X/Y: 0,024° - OK / 0,024° - OK MaxEx X/Y: 0,050° - OK / 0,050° - OK
[22.4.2019 - 24.4.2019: 2550 games] Avg X/Y: 0,019° - OK / 0,013° - OK MaxEx X/Y: 0,075° - OK / 0,075° - OK
[24.4.2019 - 25.4.2019: 2550 games] Avg X/Y: 0,006° - OK / -0,002° - OK MaxEx X/Y: -0,075° - OK / -0,025° - OK
[25.4.2019 - 26.4.2019: 2550 games] Avg X/Y: 0,016° - OK / -0,004° - OK MaxEx X/Y: 0,050° - OK / -0,025° - OK
[26.4.2019 - 28.4.2019: 2550 games] Avg X/Y: 0,024° - OK / -0,009° - OK MaxEx X/Y: 0,050° - OK / -0,050° - OK
[28.4.2019 - 29.4.2019: 2550 games] Avg X/Y: 0,022° - OK / -0,009° - OK MaxEx X/Y: 0,050° - OK / -0,025° - OK
[29.4.2019 - 30.4.2019: 2550 games] Avg X/Y: 0,893° - ERROR / -0,002° - OK MaxEx X/Y: 1,050° - ERROR / -0,025° - OK
[30.4.2019 - 1.5.2019: 2550 games] Avg X/Y: 1,024° - ERROR / -0,001° - OK MaxEx X/Y: 1,050° - ERROR / -0,025° - OK
[1.5.2019 - 3.5.2019: 2550 games] Avg X/Y: 1,027° - ERROR / -0,002° - OK MaxEx X/Y: 1,050° - ERROR / -0,025° - OK
[3.5.2019 - 4.5.2019: 2550 games] Avg X/Y: 1,036° - ERROR / -0,004° - OK MaxEx X/Y: 1,050° - ERROR / -0,025° - OK
[4.5.2019 - 5.5.2019: 2550 games] Avg X/Y: 1,045° - ERROR / -0,020° - OK MaxEx X/Y: 1,075° - ERROR / -0,050° - OK
[5.5.2019 - 7.5.2019: 2550 games] Avg X/Y: 0,784° - ERROR / -0,018° - OK MaxEx X/Y: 1,075° - ERROR / -0,050° - OK
[7.5.2019 - 8.5.2019: 2550 games] Avg X/Y: 0,466° - ERROR / -0,008° - OK MaxEx X/Y: 0,550° - ERROR / -0,025° - OK
[8.5.2019 - 10.5.2019: 2550 games] Avg X/Y: 0,058° - OK / -0,063° - OK MaxEx X/Y: 0,225° - WARNING / -0,250° - WARNING
[10.5.2019 - 10.5.2019: 766 games] Avg X/Y: 0,198° - WARNING / -0,212° - ERROR MaxEx X/Y: 0,200° - WARNING / -0,250° - WARNING

FIG. 6B

ROULETTE RIM TILT DETECTION

CROSS REFERENCE TO RELATED APPLICATIONS

This application is a continuation of U.S. patent application Ser. No. 17/063,536, filed Oct. 5, 2020, which claims benefit under 35 U.S.C. § 119(e) of Provisional U.S. Patent Application No. 62/914,308, filed Oct. 11, 2019, the contents of which is incorporated herein by reference in its entirety.

BACKGROUND OF THE INVENTION

Field of the Invention

The present invention relates to the field of gaming, particularly roulette gaming and detecting tilt during operations.

Background of the Art

Roulette is a popular wagering game played in casinos and other gaming establishments. Roulette wheels are often operated continuously and run under extremely high operational loads and continuous stress. In popular casinos, for example, roulette wheels can operate sixteen hours or more per day, and complete up to 2.7 million game cycles during a five-year life time. With an average of twenty ball spins around per game cycle, this translates to over 54 million ball rotations around the roulette's rim. As such, significant wear and tear to the roulette can be expected.

Such continuous operational use combined with other factors, such as dirt and air fan issues, can significantly affect a roulette's operation, reliability, and fairness. The predictability of each game can also be affected due to an insufficient variance of random parameters and physical factors, such as a tilted rim, an unevenly worn or damaged ball track, dirt deposits along the ball track, ineffective fans or air filters, and lack of randomness with respect to ball speed and wheel rotation. While roulette rims are typically calibrated and leveled when built, installation or subsequent movement of the machine may cause tilt. Tilt can also be caused by damage, cheating and other human factors.

In order to improve long-term reliability of the roulette generator, as well as fairness in roulette gaming operations, regular maintenance and periodic machine analysis is needed. A classic procedure of roulette rim leveling is performed using a tripod water level or even a traditional water level. However, these and other manual methods tend to be unreliable and time consuming. Methods of taking manual measurements also run risks of being inconsistent and inefficient, as individuals performing such measurements must be trained. Even then, there may be reliability concerns, as negligent personnel or service teams can introduce errors when measuring, and the individuals must be trusted not to deliberately alter or manipulate the measurements and determinations.

SUMMARY OF THE INVENTION

Illustrative examples of the disclosure include, without limitation, methods, systems, and various devices. A tilt detection system includes: a roulette wheel, at least one inclination sensor positioned on or within a rim of the roulette wheel, a display module comprising a plurality of light outputs, a processor communicatively coupled to the at least one inclination sensor and display module, and a memory comprising instructions. Positional data may be obtained from the at least one inclination sensor during operation of the roulette wheel, e.g., during a game cycle. Positional data can then determine tilt data indicative of the roulette wheel's inclination relative to a baseline. A tilt status indicative of a position and inclination angle of the roulette can be determined and output on the display module, through one or more light outputs. Such light outputs may be colored LEDs, with each color and LED identifying a tilt state of the roulette wheel, e.g., level, warning, or error, and the position and angle of inclination. Two or more stepper motors may lever the roulette wheel in response to the tilt status.

An ID chip may be associated with each inclination sensor on the roulette wheel, and one or more of the display modules, inclination sensor(s), and ID chips may be permanently or removably secured on or within the roulette wheel rim. A plurality of data sets can be identified, continuously, in real-time, or at periodic intervals, from inclination sensors and track a plurality of roulette game cycles. Such data may include a date, time cycle length, cycle number, ball speed, and ID number associated with an inclination sensor and a game cycle. In addition, the collected inclination sensor data, positional data, tilt data, and tilt status may all be stored in a database. A plurality of predictability metrics can be identified from such data, provide probability predictions Other features of the systems and methods are described below. The features, functions, and advantages can be achieved independently in various examples or may be combined in yet other examples, further details of which can be seen with reference to the following description and drawings.

BRIEF DESCRIPTION OF THE FIGURES

The drawings are provided to illustrate example embodiments described herein and are not intended to limit the scope of the disclosure.

FIG. 6B is the second portion of the example data set of FIG. 6A.

DETAILED DESCRIPTION

Figure 1:
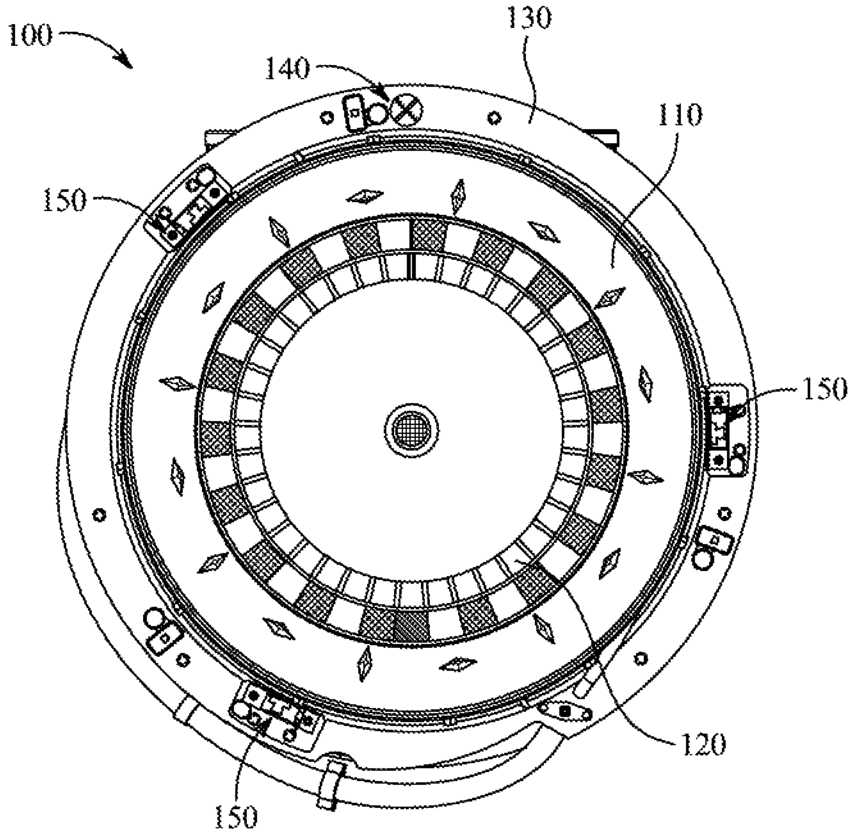
FIG. 1 is a top view illustration of a roulette wheel in accordance with embodiments.

FIG. 1 illustrates a roulette wheel 100 with that may be used with embodiments of the present disclosure. The wheel 100 may be spun in a first rotational direction and a ball (not shown in FIG. 1) may be spun in a track positioned in an upper outer portion of the wheel 110 in an opposite direction. The ball will eventually lose momentum in the track causing the ball to fall out of the track and bounce around a lower interior portion of the wheel. In various embodiments the ball track may have a lacquer coating. The lacquer coating may help reduce wear and increase lifetime expectancy. The wheel 100 may have a number of slots formed in the lower interior portion 120. The slots may each contain a number matching the numbers 0, 00 and 1-36. The wheel 100 may also include a number of protrusions in the lower interior portion that cause the ball to bounce in an unpredictable manner once the ball enters the lower interior portion.

Players typically may continue to place bets until the ball exists the track, at which point the wagering is closed. A game cycle or event concludes when the ball settles in a numbered slot and all wagers placed during the game or event are resolved. If a player has placed a bet on a particular number and the ball settles in a numbered slot that matches that particular number, the player wins the bet and is paid some multiple of the amount bet. If the ball settles in a numbered slot that does not match that particular number, the bet may be lost. The typical game cycle or event includes additional ways in which a bet may be won or lost, but those are not relevant to the present disclosure.

In an embodiment of the present disclosure, an electromechanical system may start, rotate and stop the wheel 100 and spin the ball in place of a human dealer. The other portions of the table and layout may be electronic, electromechanical, or operated by a human with players placing physical chips on the table for each game or event. A plurality of balls may be stored in a storage area under the table, with a different ball selected for each game. When a ball has settled in a numbered slot and all wagers have been resolved, the slot may include a trap door that opens so the ball may fall below the table surface and be returned to the storage area. At the same time, the system may have already selected the next ball to be spun so as to increase the pace of play. The ball may be spun by a variety of electromechanical systems, including a blower. The ball to be spun may be placed in a tube out of sight of players until air is suddenly blown behind the ball by the blower causing the ball to exit the tube and enter the track of the wheel 100. Typically, all of the balls are the same color, usually white.

In embodiments, a roulette system comprises at least one inclination sensor 150 and associated display module 140. The inclination sensor may be positioned and secured inside the roulette rim 130, on the rim itself, or another position such that the at least one inclination sensor 150 can take positional measurements during gameplay. A plurality of inclination sensors may be placed around the rim of the device, each collecting positional data from which tilt data for gaming cycles may be derived. Each sensor may be mounted on a stepper motor configured to move up and down by small increments in response to measurements from the sensors so as to self-level the wheel 100. Each sensor may also be associated with a unique ID number, such as a tracking number, and communicate, with a computing system for identification and data recordation, as further discussed below.

The display module 140 may also be positioned on the roulette rim and provide a visual indication of a tilt status of the roulette system. The display module may comprise one or more lights, e.g., LEDs, to visually output whether there are any errors and issues with respect to the device's inclination. In embodiments, the roulette system may comprise a leveling device to correct any detected tilt errors.

Figure 2:
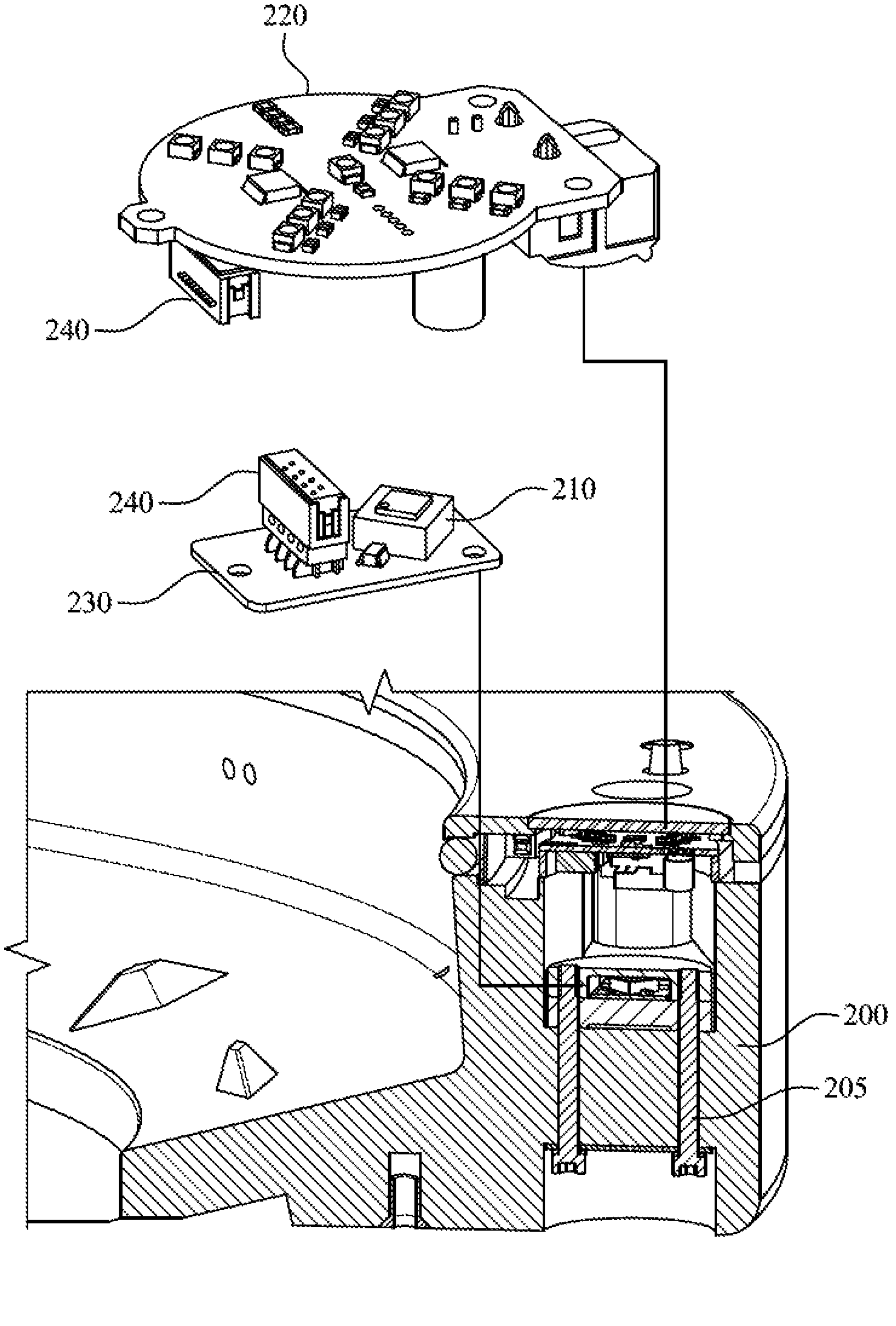
FIG. 2 is a cross-sectional view of a roulette wheel rim, and a perspective view of an inclination sensor, ID chip, and display module.

FIG. 2 illustrates an inclination sensor 240, ID chip 210, and display module 220 in accordance with various embodiments. The inclination sensor 240 can assist in determining tilt of the roulette wheel 100 during rotation by taking a plurality of positional measurement as the wheel rotates. The sensor can, for example, determine a tilt angle with respect to a baseline measurement, wherein the baseline measurement is indicative of a leveled state. The positional measurements may be one-, two-, or three-dimensional. The tilt data may also be analyzed to determine, e.g., in real-time, whether the tilt of the roulette wheel is within a normal, acceptable range. In various embodiments, the inclination sensor 140 can measure tilt up to a 0.025° resolution. For reference, a roulette ball is 0.3 mm in diameter.

The inclination sensor 240 can be separate from the ID chip 210, positioned together, e.g., on a plate 230, and placed within the roulette rim. In other embodiments, they may comprise a single module. FIG. 2 illustrates a cross-section of a roulette wheel rim 200 and shows where the stepper motor 205, the inclination sensor 240 and the ID chip 210 are positioned within a central portion of the rim 200. The stepper motor 205 and ID chips may also be separate from the location of the inclination sensor 240. In an example, the inclination sensor and ID chip may be placed on a bottom face of the display module 220. The display module 220 may then be positioned on or secured within the rim such that a light 225 on a top face of the display module 220 is visible on the top face of the rim.

The display module 220, inclination sensor 140, and ID chip 210 may all be in communication, (e.g., Bluetooth, wireless, etc.) with a computing system. The inclination sensor 140 may be configured to collect positional data while the roulette wheel spins and transmit the data to the computing system and/or storage device. The computing device, through one or more software programs, may determine tilt data and tilt status based on the measurements from the one or more inclination sensors. The tilt status can be output to the display module, which illuminates one or more lights identifying at least one of a tilt status, position, and angle of the roulette wheel.

Figure 3:
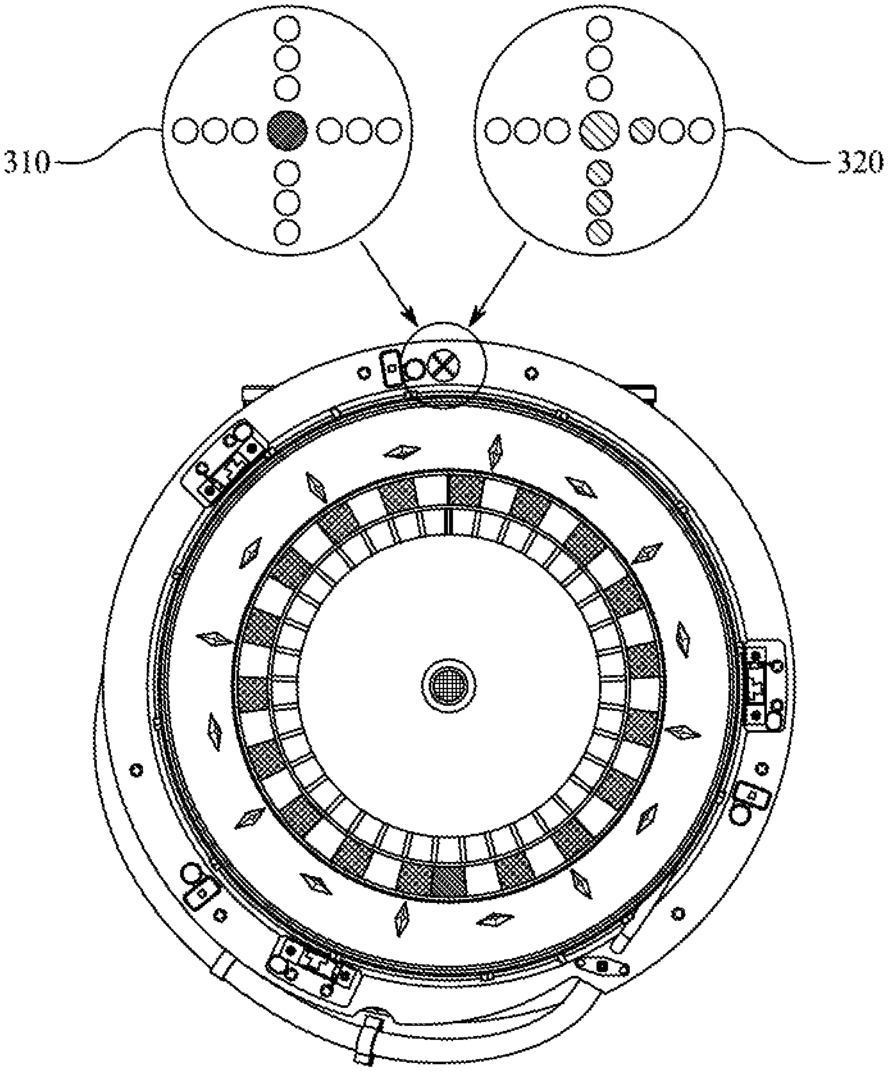
FIG. 3 is a top view illustration of a roulette wheel and inclination display outputs.

As illustrated in FIGS. 2-3, the inclination display light 225 on the display module 220 can comprise at least one LED and provide the visual indication of a tilt status. That is, the tilt status may be indicative of whether the tilt of the roulette wheel is within an acceptable range. For example, when the measured tilt surpasses a threshold tilt angle the inclination display 220 may display a red light 320, indicative of an issue with the tilt. In embodiments, a plurality of lights may indicate the position of the tilt on the roulette wheel. FIG. 3, for example, shows at display 320 that the roulette wheel is tilting primarily in the bottom right portion of the wheel. Each light may be indicative of a specific range of tilt angles. For example, a first LED indicates a 0.025°-0.12° rim inclination, the second LED indicates a 0.12°-0.2° inclination, corresponding to a WARNING, and a third LED indicates a >0.2° inclination, corresponding to an ERROR.

If the tilt is corrected and/or when the measured tilt falls within a normal range, e.g., <0.025°, the inclination display may display a green light 310. It will be appreciated that the green and red colors of LED displays are merely examples of a plurality of display methods to identify the current tilt state of the roulette wheel, and other colors and types of visual display may be used with embodiments discussed herein.

In embodiments, a processor may monitor positional and/or tilt data over a number of game cycles before determining a tilt status. For example, if a rim is determined to be unleveled for a number of game cycles, e.g., one, two, ten, fifteen, etc., the error can be displayed by the one or more LEDs. In other embodiments, the output at the display module may reflect the tilt status in real-time.

Various types of roulette leveling procedures can also be performed in accordance with embodiments. In some examples, height adjustable legs may be positioned beneath the roulette wheel and adjusted based on the displayed inclination error. In other embodiments, the roulette wheel may be equipped with an automatic leveling system such as the stepper motors 205. In various embodiments, however, the roulette leveling can be performed automatically or manually.

Figure 4:
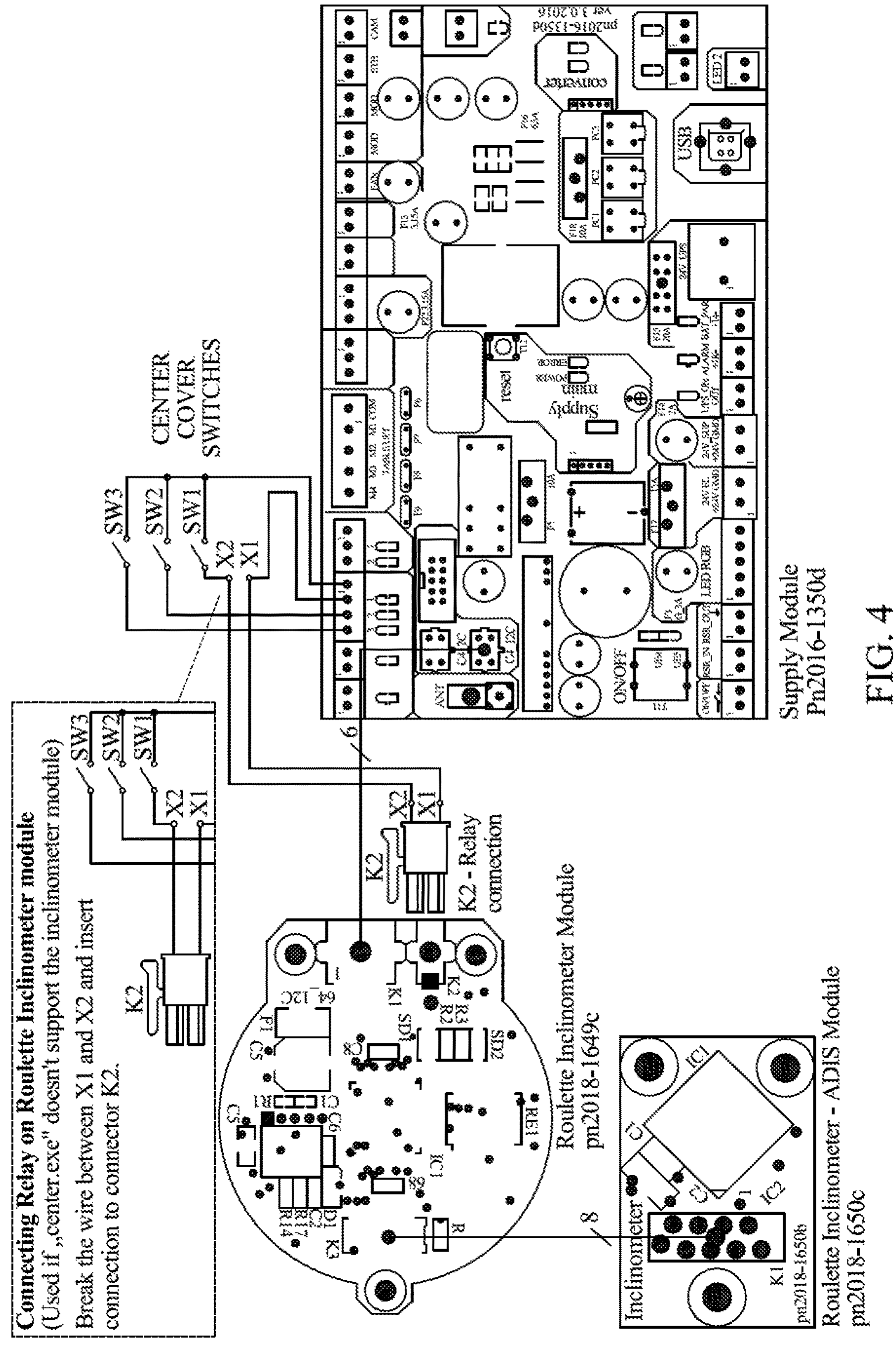
FIG. 4 is a schematic drawing of a connecting relay on a roulette inclinometer module without software support.
Figure 5:
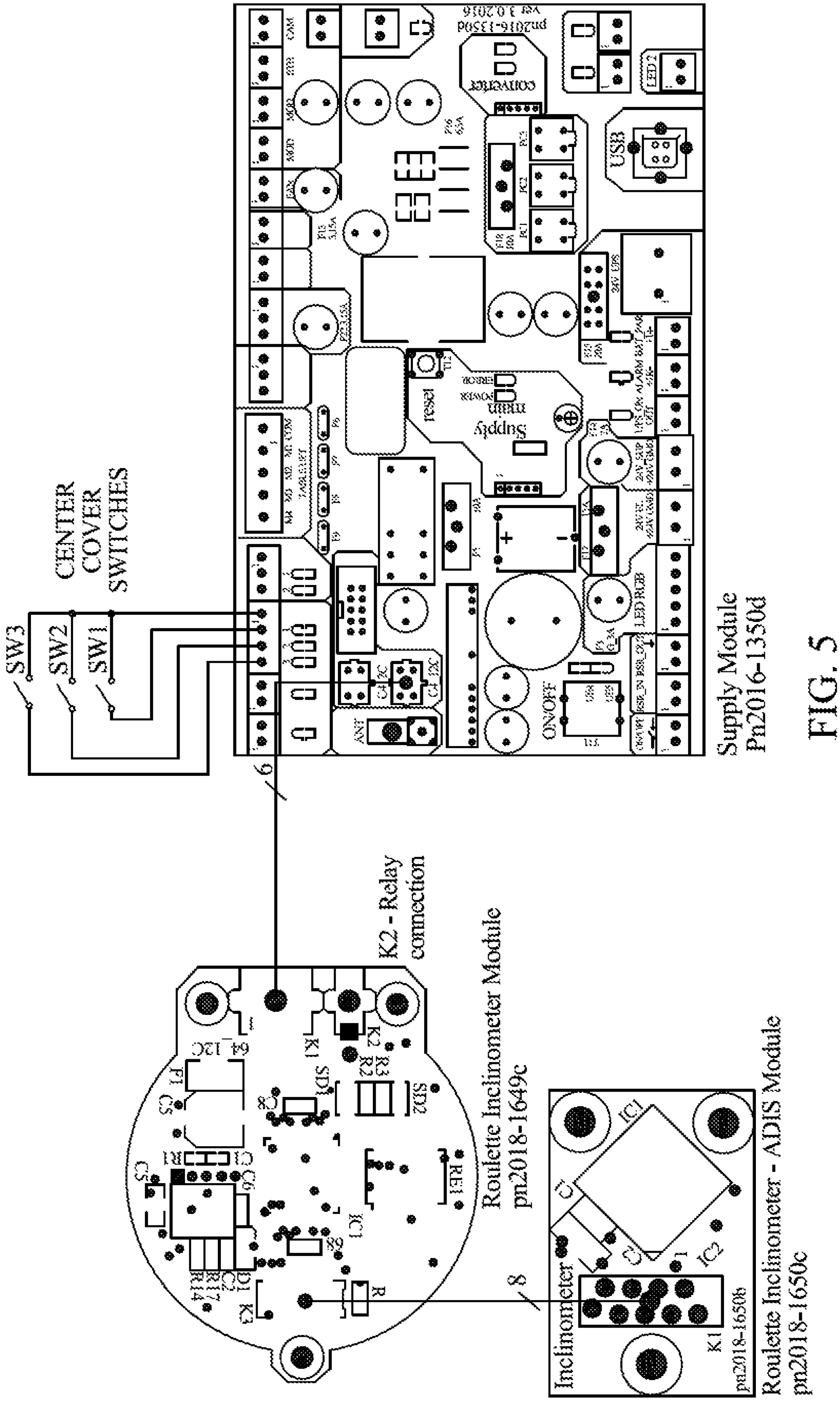
FIG. 5 is a schematic drawing of a connecting relay on a roulette inclinometer module with software support.

FIGS. 4-5 illustrate schematic drawings of circuitry indicative of a connecting relay on a roulette inclinometer module. In particular, the schematics identify two levels of inclination sensor connections, with respect to a software module (see FIGS. 6A and 6B), center.exe, which assists in determining and analyzing the inclination sensor data. FIG. 4 illustrates a connection without center.exe software support. In this model, an inclination error is reported as a Cover Switch Open error, and the inclination data is not logged into a generator database. FIG. 5 illustrates a connection with center.exe software support. Here, the inclination error is reported as "Roulette Rim Not Leveled" error, and inclination data is logged in a generator database for each game cycle.

Figure 6A:
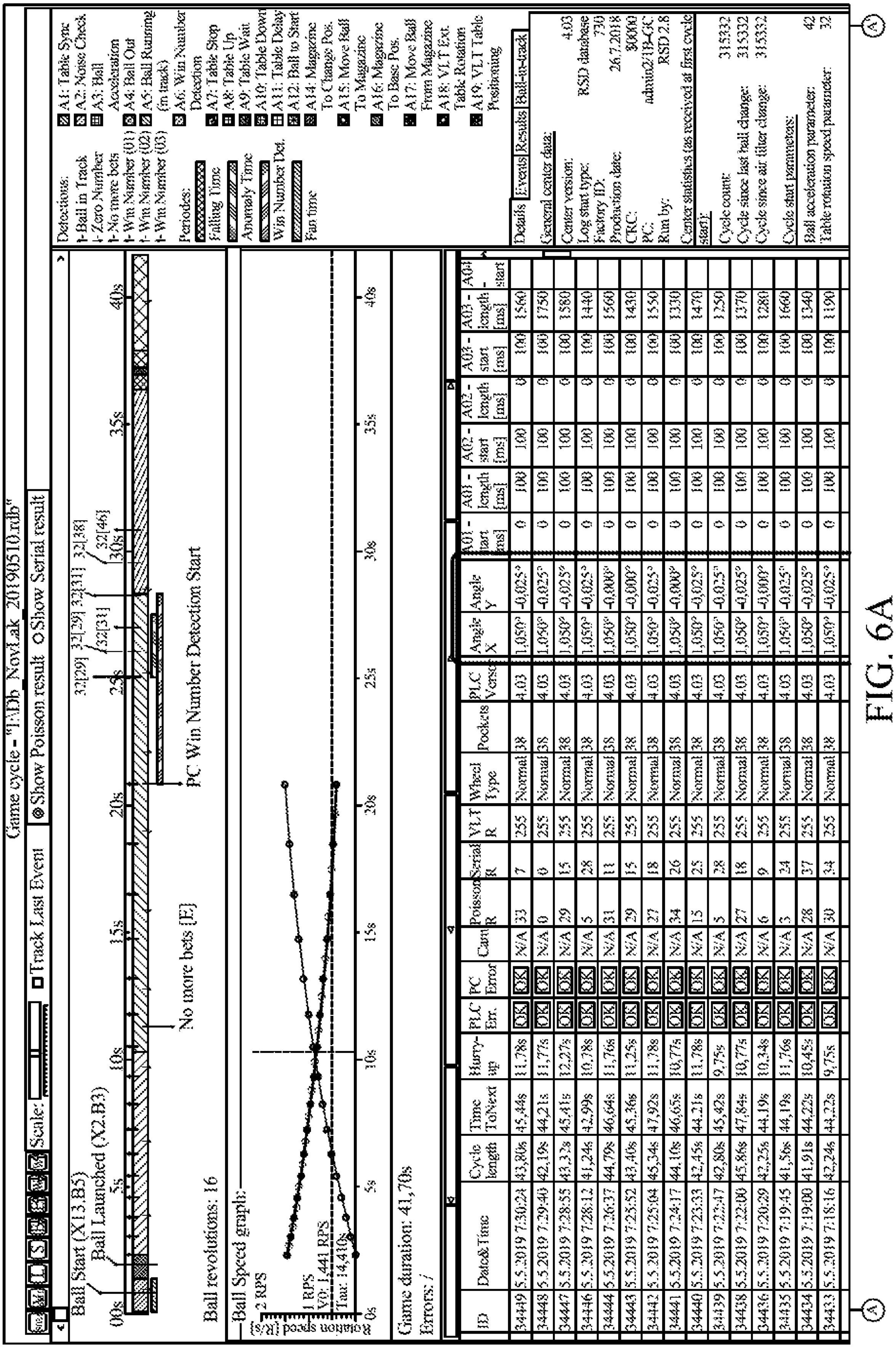
FIG. 6A is a first portion of an example data set obtained from an inclination sensor.

FIGS. 6A and 6B show an example data set obtained from the inclination sensor's measurements. For purposes of this disclosure, the actual data illustrated is merely exemplary or how data may be provided, not the actual data itself. As for the actual data, each inclination sensor can determine a tilt angle with respect to an x-axis and y-axis of the module, and measure with respect to a roulette cycle. Each data point can be associated with a date, time, cycle length, cycle number, ball speed, and ID number, which corresponds an inclination sensor. The data set can form a visual graph indicative of one or more aspects of the roulette cycle, including ball speed, and timing of the ball launch. Each roulette cycle and its corresponding tilt measurement information may be stored in a database.

In addition, the data set and program can analyze the timing, position, and angle, and output a determination indicative of the acceptability of the tilt. In one example, a color-coded output, corresponding to "OK", "ERROR", or "WARNING" can be highlighted and output for each determined tilt angle. Such analyses may be performed in real time so that real-time diagnoses of tilt issues can be conveyed.

Figure 7:
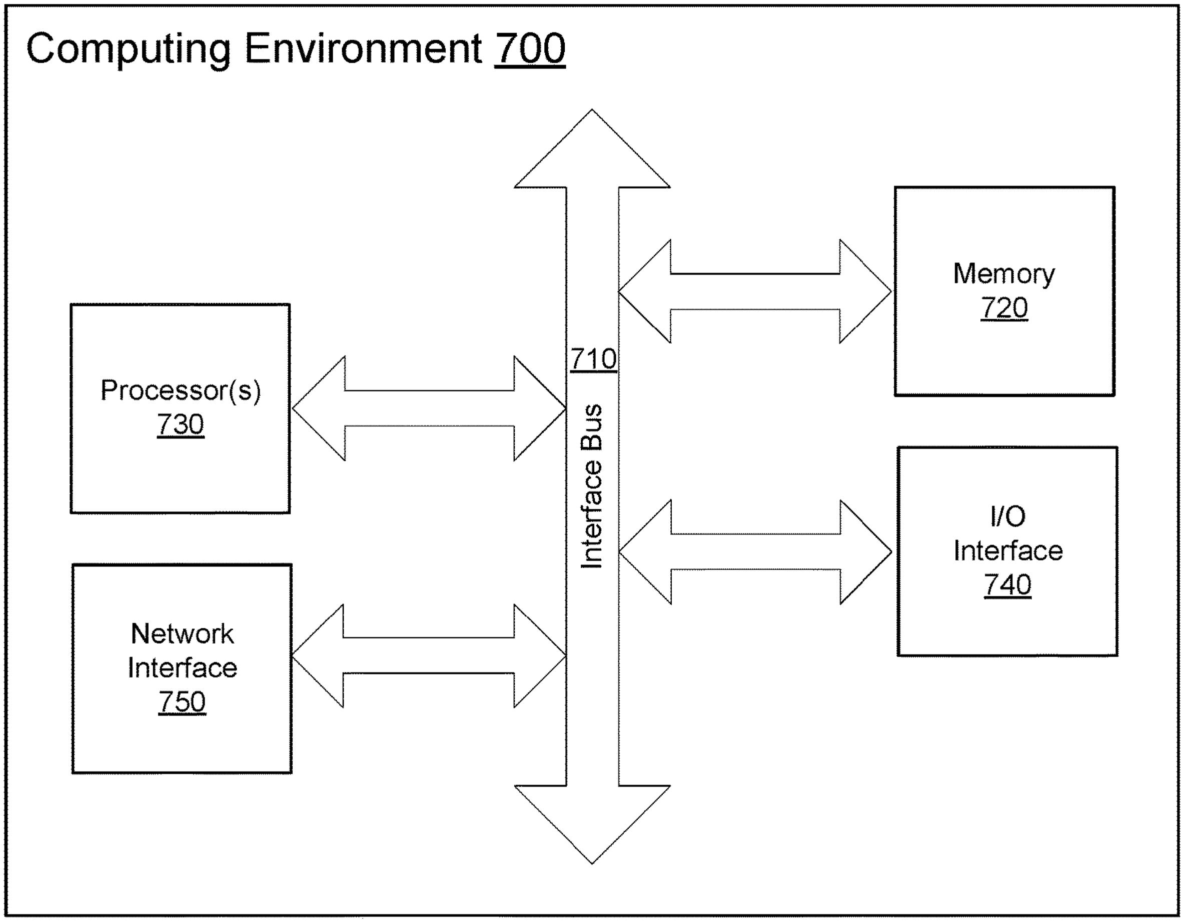
FIG. 7 is a computing environment applicable to embodiments discussed herein.

In embodiments, the inclination sensor can enable precise leveling at all times through an automatic database check report. The automatic database check analysis helps to detect possible problems and operations related to estimating and verifying wheel predictability. Wheel predictability may be show in the report as a percentage and is a crucial roulette generator parameter, along with randomness. The database check reviews previously collected tilt data, tilt errors, and can identify metrics related to the roulette wheel's use, history, and issues, as well as predict probabilities related to predictability. In an example, an automatic database check can occur every two months of operation. However, database checks can be schedule to occur at any predetermined interval of time and/or upon FIG. 7 illustrates an exemplary computing environment in which embodiments of the present invention is depicted and generally referenced as computing environment 700. As utilized herein, the phrase "computing system" generally refers to a dedicated computing device with processing power and storage memory, which supports operating software that underlies the execution of software, applications, and computer programs thereon. As shown by FIG. 7, computing environment 700 includes bus 710 that directly or indirectly couples the following components: memory 720, one or more processors 730, I/O interface 740, and network interface 750. Bus 710 is configured to communicate, transmit, and transfer data, controls, and commands between the various components of computing environment 700.

Computing environment 700 typically includes a variety of computer-readable media. Computer-readable media can be any available media that is accessible by computing environment 700 and includes both volatile and nonvolatile media, removable and non-removable media. Computer-readable media may comprise both computer storage media and communication media. Computer storage media does not comprise, and in fact explicitly excludes, signals per se.

Computer storage media includes volatile and nonvolatile, removable and non-removable, tangible and non-transient media, implemented in any method or technology for storage of information such as computer-readable instructions, data structures, program modules or other data. Computer storage media includes RAM; ROM; EE-PROM; flash memory or other memory technology; CD-ROMs; DVDs or other optical disk storage; magnetic cassettes, magnetic tape, magnetic disk storage or other magnetic storage devices; or other mediums or computer storage devices which can be used to store the desired information and which can be accessed by computing environment 700.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media, such as a wired network or direct-wired connection, and wireless media, such as acoustic, RF, infrared and other wireless media. Combinations of any of the above should also be included within the scope of computer-readable media.

Memory 720 includes computer-storage media in the form of volatile and/or nonvolatile memory. The memory may be removable, non-removable, or a combination thereof. Memory 720 may be implemented using hardware devices such as solid-state memory, hard drives, optical-disc drives, and the like. Computing environment 700 also includes one or more processors 730 that read data from various entities such as memory 720, I/O interface 740, and network interface 750.

I/O interface 740 enables computing environment 700 to communicate with different input devices and output devices. Examples of input devices include a keyboard, a pointing device, a touchpad, a touchscreen, a scanner, a microphone, a joystick, and the like. Examples of output devices include a display device, an audio device (e.g. speakers), a printer, and the like. These and other I/O devices are often connected to processor 710 through a serial port interface that is coupled to the system bus, but may be connected by other interfaces, such as a parallel port, game port, or universal serial bus (USB). A display device can also be connected to the system bus via an interface, such as a video adapter which can be part of, or connected to, a graphics processor unit. I/O interface 740 is configured to coordinate I/O traffic between memory 720, the one or more processors 730, network interface 750, and any combination of input devices and/or output devices.

Network interface 750 enables computing environment 700 to exchange data with other computing devices via any suitable network. In a networked environment, program modules depicted relative to computing environment 700, or portions thereof, may be stored in a remote memory storage device accessible via network interface 750. It will be appreciated that the network connections shown are exemplary and other means of establishing a communications link between the computers may be used.

It is understood that the term circuitry used through the disclosure can include specialized hardware components. In the same or other embodiments circuitry can include microprocessors configured to perform function(s) by firmware or switches. In the same or other example embodiments circuitry can include one or more general purpose processing units and/or multi-core processing units, etc., that can be configured when software instructions that embody logic operable to perform function(s) are loaded into memory, e.g., RAM and/or virtual memory. In example embodiments where circuitry includes a combination of hardware and software, an implementer may write source code embodying logic and the source code can be compiled into machine readable code that can be processed by the general purpose processing unit(s). Additionally, computer executable instructions embodying aspects of the invention may be stored in ROM EEPROM, hard disk (not shown), RAM, removable magnetic disk, optical disk, and/or a cache of processing unit. A number of program modules may be stored on the hard disk, magnetic disk, optical disk, ROM, EEPROM or RAM, including an operating system, one or more application programs, other program modules and program data. It will be appreciated that the various features and processes described above may be used independently of one another or may be combined in various ways. All possible combinations and sub-combinations are intended to fall within the scope of this disclosure.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the disclosure. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of certain of the disclosure.

What is claimed:

1. A tilt detection system, comprising:

a roulette wheel configured for rotation during a game of roulette;

at least one inclination sensor positioned within a rim of the roulette wheel;

a processor communicatively coupled to the at least one inclination sensor and a memory comprising instructions that, when executed by the processor, cause the tilt detection system to at least:

obtain positional data from the at least one inclination sensor during the rotation of the roulette wheel;

determine tilt data based on the positional data, wherein the tilt data is indicative of inclination of the roulette wheel relative to a baseline; and adjust the roulette wheel based on the tilt data.

2. The tilt detection system of claim 1, wherein the inclination sensor is removably placed within the rim of the roulette wheel.

3. The tilt detection system of claim 1, wherein the tilt data identifies a position and an angle of tilt of the roulette wheel.

4. The tilt detection system of claim 1, further comprising an identification chip associated with each inclination sensor.

5. The tilt detection system of claim 1, further comprising a plurality of lights coupled to the processor that display a position and an angle of tilt of the roulette wheel based on the tilt data.

6. The tilt detection system of claim 5, wherein the plurality of lights are placed within the rim of the roulette wheel.

7. The tilt detection system of claim 1, wherein the tilt data is determined in realtime.

8. The tilt detection system of claim 1, wherein the positional data is two-dimensional or three-dimensional positional data.

9. The tilt detection system of claim 1, wherein the positional data is obtained continuously or at periodic intervals during the rotation of the roulette wheel.

10. The tilt detection system of claim 1, wherein the tilt data indicates a leveled rim, a warning, or an error.

11. The tilt detection system of claim 1, further comprising two or more stepper motors for leveling the roulette wheel in response to the tilt data.

12. A tilt detection method, comprising:

rotating a roulette wheel;

obtaining positional data from at least one inclination sensor during the rotating of the roulette wheel, wherein the at least one inclination sensor is positioned within a rim of the roulette wheel;

determining tilt data based on the positional data wherein the tilt data is indicative of inclination of the roulette wheel relative to a baseline; and adjusting the roulette wheel based on the tilt data.

13. The method of claim 12, further comprising determining one or more of a date, time, cycle length, cycle number, ball speed, and ID number.

14. The method of claim 12, further comprising displaying a visual output of at least one of the positional data and the tilt data on a computing device.

15. The method of claim 12, further comprising storing at least one of the positional data and the tilt data in a database.

16. The method of claim 15, further comprising determining predictability metrics based on the at least one of the positional data and the tilt data stored in the database.

17. The method of claim 16, wherein the predictability metrics are determined after a predetermined interval of time.

18. The method of claim 12, further comprising adjusting the roulette wheel to a leveled state, in response to the tilt data.

19. The method of claim 12, wherein the tilt data indicates a leveled rim, a warning, or an error.

20. The tilt detection system of claim 12, further comprising two or more stepper motors for leveling the roulette wheel in response to the tilt data.

* * * * *